Patented Mar. 18, 1952

2,589,909

UNITED STATES PATENT OFFICE 2,589,909

PRODUCTION OF TITANIUM DIOXIDE

John H. Weikel, Palmerton, Pa., assignor to The New Jersey Zinc Company, New York, N. Y., a corporation of New Jersey No Drawing. Application March 24, 1949, Serial No. 83,285

4 Claims. (Cl. 23—202)

This invention relates to the production of titanium dioxide pigment and, more particularly, to the production of such pigment from titaniferous slags obtained by the smelting of iron-titanium ores. The invention resides in a novel method of oxidizing the titanium content of such slags having a valence of less than four, whereby the efficient production of a titanium dioxide pigment of high quality may be obtained.

Titanium dioxide pigment can be produced from titanium ores such as ilmenite by digesting the ore with concentrated sulfuric acid, leaching the digested ore with water to obtain a titanium sulfate solution containing from 200 to 250, and preferably about 220 to 230, grams per liter of titanium sulfate, and then precipitating the titanium dioxide from the solution by hydrolysis. In such a process, which is described in the United States patent to Washburn, No. 1,889,027, the titanium ore is mixed with concentrated sulfuric acid in a suitable vessel, and steam is blown into the mass in order to raise its temperature to a value closely approximating that at which the sulfuric acid reacts with the titanium ore. Air may be introduced into the mass along with the steam in order to facilitate agitation. A small amount of water is then introduced into a portion of the heated mass to provide further local heating by dilution of the concentrated acid, and such local heating is sufficient to initiate the reaction between the acid and the ore. The exothermic heat of reaction causes the reaction to spread rapidly throughout the entire mass and results in the generation of sufficient heat to volatilize a large proportion of the water contained in the reaction mass. As described in the patent to Washburn, the introduction of air into the mass may be continued during the reaction period in order to control the reaction temperature, to facilitate mixing of the reactants and to obtain the porosity of the solid reaction product desired to facilitate subsequent leaching. The final reaction product, at the end of the violent reaction period, comprises a hard mass containing generally about 85% of the original titanium content in the form of titanium sulfate. It is conventional practice to follow the foregoing type of digestion procedure with a "baking" treatment wherein the reaction product is allowed to cool slowly over a period of several hours in order to afford an opportunity for more of the titaniferous material to be converted to the sulfate.

The titaniferous slags produced in accordance with the United States patent of Peirce, Waring and Fetterolf, No. 2,476,453, may be digested with sulfuric acid by the Washburn process. Such titaniferous slags are those obtained by the smelting of titaniferous ores such as ilmenite to remove the major portion of the iron content thereof in the form of pig iron. The slag contains virtually all of the titanium content of the ore, together with a controlled amount of iron oxide as well as slag forming gangue constituents originally present in the ore and possibly some extraneously added lime. Such titaniferous slags, unlike ilmenite ore, yield a digested product which sets in the form of a porous cake without the necessity of introducing air into the reaction mass during the reaction period. When digested in a continuous operation, as in a rotating kiln or the like, the reaction mass is both granular and porous.

Virtually all of the titanium present in ilmenite ore or the like is in the tetravalent state, and consequently all of the titanium sulfate present in the solution obtained by leaching the digested titanium ore is in the tetravalent state in the form of titanic sulfate. It is well established in the art that all of the iron (ferric sulfate) present as a contaminant in the titanium sulfate solution must be maintained in the ferrous state throughout the entire pigment-producing operation in order to minimize adsorption of iron and other miscellaneous oxides on the particles of titanium dioxide produced during hydrolysis. The ferric sulfate can be reduced to ferrous sulfate by the addition of metallic iron or zinc to the leach solution. In order to insure a safe reserve of reduced material which may be preferentially oxidized before the ferrous iron is re-oxidized by any oxidizing condition which may be encountered in the subsequent pigment-producing operation, enough metallic iron or zinc is added to the solution to reduce first all of the ferric iron and then reduce a small amount of the titanic sulfate to titanous sulfate. In general, about 200 pounds of metallic iron or zinc per ton of ore digested is required to reduce all of the ferric iron to the ferrous state and to additionally produce about 1.–1.5 grams per liter of trivalent titanium in the leach solution, the latter being considered to offer the necessary reserve of reduced material to insure good pigment quality.

Titaniferous slags, on the other hand, having been produced under reducing conditions sufficient to recover metallic iron therefrom, may contain up to about 30 per cent of their titanium value in a reduced form having a valence of less than four, such reduced titanium being referred to collectively herein as "trivalent titanium" and the corresponding sulfate as "titanous sulfate." As a result, the leach solution obtained from such sulfuric acid-digested titaniferous slags contains substantially more than one gram per liter of trivalent titanium in the form of titanous sulfate. Inasmuch as titanous sulfate will not yield titanium dioxide by hydrolysis in accordance with the Blumenfeld method or any other hydrolysis procedure now known, that portion of the trivalent titanium in excess of the desired reserve of about 1.–1.5 grams per liter remains in the mother liquor and is lost to the production of titanium dioxide. Accordingly, it is a practical necessity that the excess trivalent titanium be oxidized to the tetravalent state.

Oxidation of excess trivalent titanium in titaniferous slags can be effected prior to digestion by roasting the slag to convert its content of titanous oxide, or other lower oxides, to titanium dioxide. A roasting step of this nature requires additional equipment and handling and is objectionably expensive for these reasons. Oxidation of the trivalent titanium can be effected after digestion by blowing air through the leach solution while agitating it mechanically, but such an oxidizing treatment requires a separate corrosion-resistant aeration tank wherein the leach solution is held for a period of about 3 to 10 hours during aeration, the length of the period depending upon the amount of trivalent titanium (dissolved titanous sulfate) to be oxidized. More rapid oxidation of the dissolved titanous sulfate can be effected by the addition of hydrogen peroxide to the leach solution or by aeration of the leach solution in the presence of activated carbon, but both types of accelerated oxidation are too expensive for practical commercial operation.

I have now found that oxidation of trivalent titanium to the tetravalent state can be effected readily during the baking stage of the digestion operation without requiring additional equipment and without interposing any delay in the flow schedule of conventional operation. Thus, in the sulfuric acid digestion of titaniferous material containing more than about one per cent of its titanium in a reduced state having a valence of less than four wherein the titaniferous material is heated in admixture with concentrated sulfuric acid to initiate reaction therebetween and the reaction mass is permitted to set in the form of a porous mass, I have found that the reduced titanium can be oxidized to the tetravalent state by passing an oxygen-containing gas through the porous mass and by maintaining the mass at an elevated temperature sufficient to provide oxidation of the reduced titanium to the tetravalent state by the oxygen content of said gas passing therethrough. Although the method of my invention is equally applicable to the reaction mass whether in the form of a cake resulting from a batch digestion operation or in the form of a granular mass resulting from a continuous digestion operation, the method will be described herein, by way of illustration and explanation, only with regard to treatment of the reaction mass in the form of a porous cake.

The oxidation of the reduced titanium to the tetravalent state which is effected in accordance with my invention by passing an oxygen-containing gas through the porous cake resulting from the digestion reaction cannot be accomplished to any appreciable extent by introducing the oxygen-containing gas into the reaction mass either prior to or during the digestion reaction. The mixture of titaniferous material and sulfuric acid, both before the digestion reaction is initiated and during the reaction itself, is in a fluid condition. In this condition, the particles of solid titaniferous material are completely immersed in a liquid medium, and the introduction of air into such a fluid mass provides little opportunity for contact between the oxygen contained in the gas and the titanium. However, upon completion of the digestion reaction, during which a major portion of the aqueous medium is vaporized and driven out of the reaction mass, the mass sets in the form of a relatively hard but porous cake which makes possible intimate contact between the oxygen and the titanium with resulting oxidation of the reduced titanium on a practicable scale.

Oxidation of trivalent titanium (titanous sulfate) to the tetravalent state by contact with air requires the maintenance of an elevated temperature. The introduction of an oxygen-containing gas into the porous cake resulting from completion of the violent digestion reaction tends to produce by itself a drastic cooling effect. Although the porous cake appears to be a hard dry mass, it nevertheless contains a considerable amount of moisture, and the evaporation of this moisture by the passage of the oxygen-containing gas through the cake quickly absorbs sensible heat from the cake. The magnitude of this chilling effect produced by evaporation is so great that even when the oxygen-containing gas is preheated to a temperature considerably above the temperature of the porous cake at the end of the digestion reaction, the heat removed by evaporation exceeds the sensible heat content of the preheated gas and the net effect remains that of chilling the cake. I have found, however, that the application of extraneous heat to the porous cake while the oxygen-containing gas is passed therethrough can substantially overcome the chilling effect of such evaporation so that an oxidation-promoting temperature may be maintained substantially throughout the porous mass.

The amount of oxygen-containing gas which is passed through the porous cake in accordance with my invention is not critical and depends primarily upon such practical considerations as the oxygen content of the oxygen-containing gas, the amount of reduced titanium present in the cake, the extent to which it is desired to oxidize this reduced titanium to the tetravalent state, and the period of time which can be devoted to the oxidation treatment. The amount of heat which must be supplied to the cake will, of course, vary with the rate at which the oxygen-containing gas is passed therethrough and with the temperature which it is desired to maintain in the cake.

The oxygen content of the oxygen-containing gas may vary considerably and will depend largely upon the source of the gas. For example, I have found atmospheric air to be particularly satisfactory as the oxidizing medium in accordance with the invention. However, oxygen-enriched air or commercial oxygen alone may be used with advantage, the high oxygen content of such gases making possible the desired oxidation with the use of a smaller volume of gas which, in turn, requires the application of less extraneous heat to the porous cake in order to maintain the desired oxidation temperature therewithin. The oxygen-containing gas may also comprise the exhaust gas from a wholly unrelated process such as the exhaust gas from an operation in which air is passed in contact with a carbonate-containing material in effecting high temperature calcination thereof. In such case, the sensible heat of the oxygen-containing gas may be availed of in maintaining the oxidizing temperature required in accordance with the present invention. The oxygen-containing gas may also be wholly artificial, such as that resulting from the addition of oxygen to the exhaust combustion gases from a heating operation associated with a metallurgical operation or the like.

The amount of reduced titanium contained in the porous cake depends upon the amount of reduced titanium contained in the titaniferous material which is subjected to the sulfuric acid digestion. In the case of titaniferous slags of the type described in the aforementioned Peirce, Waring and Fetterolf application, which contain from about 2 to 20% iron oxide (calculated as Fe), the slag will contain reduced titanium in amounts which vary inversely with the iron content of the slag. The relatively low-iron slags are obtained under strong reducing conditions and are accompanied by relatively large amounts of reduced titanium, whereas the high-iron slags are obtained by less drastic reducing conditions and contain a smaller amount of reduced titanium. For example, such slags containing about 18 to 20% Fe, after digestion, will yield leach solutions containing, in addition to about 220-230 grams per liter of titanic sulfate, about 3 to 6 grams per liter of reduced titanium (expressed as trivalent titanium). On the other hand, slags containing about 5 to 10% Fe, after digestion, will yield similar titanic sulfate leach solutions containing about 30 to 35 grams per liter of reduced titanium. Thus, with a uniform rate of introduction of the oxygen-containing gas into porous cakes obtained by digestion of the aforementioned typical slags, less oxidation will be required for the higher-iron slag than for the lower-iron slag. However, as more fully discussed hereinafter, it is advisable that the oxidation treatment, which is carried out at an elevated temperature, be continued for a sufficient period of time to accomplish baking of the cake in accordance with conventional practice.

As pointed out hereinbefore, it is conventional practice to insure the presence in the leach solution from which the titanium dioxide is precipitated by hydrolysis an amount of trivalent titanium equal to about one gram per liter of Ti$^{+++}$ in order to produce titanium dioxide pigment of high quality. The oxidation treatment in accordance with my invention may be carried out to such an extent as to lower the trivalent titanium content of the digested titaniferous material to that value which corresponds to one gram per liter of trivalent titanium in the leach solution. However, it is not necessary that the oxidation treatment be so accurately controlled. For example, the oxidation treatment may be carried out for a sufficient period of time to insure oxidation of all of the trivalent titanium to the tetravalent state, following which the presence of one gram per liter of reduced titanium in the leach solution may be obtained under carefully controlled conditions by the addition of metallic iron or zinc to the leach solution. On the other hand, the major portion of the trivalent titanium in the digested titaniferous material may be oxidized to the tetravalent state, thus leaving somewhat more reduced titanium in the solid product than that which correspond to one gram per liter of trivalent titanium in the leach solution. In the latter case, the reduced titanium content of the leach solution can subsequently be lowered to the desired value under carefully controlled conditions by agitating the solution while blowing air therethrough or by the use of other oxidizing agents such as hydrogen peroxide, or the like, as mentioned hereinbefore.

The length of the oxidation treatment for a porous cake obained from a slag of any specific reduced titanium content will vary inversely with the temperature maintained in the porous cake during the oxidation treatment. For example, a porous cake which can have its reduced titanium oxidized to the desired extent in a period of about 2½ hours when the heat supplied to the cake is sufficient to maintain a cake temperature of about 170° C. can be oxidized to the same extent in a matter of 30 minutes or less when a cake temperature of about 200° C. is maintained. The foregoing illustration represents typical operation in accordance with the invention in which the porous cake obtained upon digestion of a one-ton mass of slag is oxidized by the introduction thereinto of about 10 cubic feet of air per minute and by applying extraneous heat to the exterior of the digester in amount sufficient to maintain the aforementioned temperatures. The slag in the foregoing illustration was one which, if simply baked but not oxidized following digestion, would yield a leach solution containing about 35 grams per liter of reduced (trivalent) titanium, and the oxidation treatment was sufficient to yield a leach solution containing about 7 grams per liter of trivalent titanium. In general, I have found it necessary to maintain a temperature of at least 150° C. in the reaction cake in order to effect the desired oxidation treatment, although temperatures as high as 250-260° C. may be used with advantage. I prefer, however, to maintain cake temperatures in the range of about 170-200° C., such temperatures resulting in sufficiently rapid oxidation under economical heating conditions.

The heat suplied to the porous cake during the oxidation treatment in accordance with the invention may be provided by any suitable means. For example, such heat may be provided by a conventional heating jacket surrounding at least a portion of the digester, the jacket being supplied with hot air, hot waste gases, or with a mixture of a combustion gas and air which are burned within the jacket. Heating may also be provided by heating coils surrounding the digester, the coils being supplied with hot gases or superheated steam. Alternatively, the heat may be provided by electrical resistance space heaters applied to the exterior surface of the digester and appropriately heat-insulated to minimize heat loss to the surroundings. Still another method of providing such heat is described and claimed in the co-pending application of Erwin L. Schneider, Serial No. 83,290, filed concurrently herewith, this method involving the introduction of steam into the porous reaction cake along with the oxygen-containing gas. The presence of the steam within the reaction cake minimizes absorption of heat by evaporation of moisture contained in the cake and further supplies extraneous heat to counteract other heat losses.

The rate at which the oxygen-containing gas is passed through the porous cake in accordance with the invention may vary considerably. The flow rate should be sufficient to provide a moving supply of oxygen throughout the cake, and this in turn depends upon the oxygen content of the gas. The upper limit to the amount of gas passed through the cake is governed by the resistance of the cake to the passage of gas therethrough and primarily by the amount of evaporative cooling, which can be offset by the application of heat to the mass while maintaining the necessary oxidation temperature. Prolonging the oxidation treatment has substantially the same effect as increasing the rate of gas flow through the porous cake and has the advantage of somewhat greater heat economy. For example, when about one cubic foot of air per minute is passed through the porous cake resulting from digestion of about 100 pounds of titaniferous slag high in lime and relatively low in iron, the maintenance of this air flow for a period of 2 hours while the cake is heated to maintain a temperature of 180-185° C. produced an oxidized cake which, when leached, yielded a titanium sulfate solution containing 9.0 grams per liter of trivalent titanium ($Ti^{+++}$) with a total titanium content representing a recovery of 88.4% of the titanium content of the slag. When the same air flow was maintained for a period of 3 hours through another similar digestion cake obtained from the same slag and maintained at the same oxidation temperature, the leach solution contained only 3.7 grams per liter of trivalent titanium with a total titanium content which represented a recovery of 90.1% of the titanium content of the slag. The important consideration in the choice of flow rate of oxygen-containing gas through the digestion cake is that the gas will produce the desired amount of oxidation of the titanium in the period of time required to effect adequate baking of the cake at the prevailing oxidation temperature.

The oxidation of trivalent titanium to the tetravalent state by the method of my invention has a concomitant advantage in that it improves the results accomplished by the baking treatment. The digestion reaction itself generally converts about 80 to 85% of the titanium originally present in the titaniferous material to the form of titanium sulfate. In the course of the conventional baking stage, the self-contained heat of the digestion cake is allowed to dissipate slowly in order to afford the titanium content of the cake the opportunity to become more completely sulfated before the cake temperature falls to a value at which further sulfation ceases. In general, such conventional baking will raise the amount of titanium which is sulfated to about 94-95%. In accordance with the oxidation treatment of my present invention, wherein the porous cake is maintained at an elevated temperature while the oxygen-containing gas is passed therethrough, the maintenance of such an elevated temperature makes possible the conversion of up to 98-99% of the titanium to the sulfate form in the same or shorter period of time.

I claim:

1. In the sulfuric acid digestion of titaniferous material, said material having been obtained by electrothermal smelting of a titaniferous ore in the presence of a carbonaceous reducing material and consequently containing more than one per cent of its titanium in a reduced state having a valence of less than four, wherein the titaniferous material is heated in admixture with concentrated sulfuric acid to initiate exothermic reaction therebetween, the hot reaction mass is permitted to set in the form of a hard porous cake, and the resulting hot cake is baked by being retained at an elevated temperature for a sufficient period of time to effect more complete conversion of the titaniferous material to titanium sulfate, the improvement which comprises passing an oxygen-containing gas through the porous cake during the baking stage, and maintaining the porous cake during the passage of said gas therethrough at an elevated temperature within the range of 150° to 260° C. in order to promote oxidation of the reduced titanium to the tetravalent state by the oxygen content of said gas passing therethrough.

2. In the sulfuric acid digestion of titaniferous material, said material having been obtained by electrothermal smelting of a titaniferous ore in the presence of a carbonaceous reducing material and consequently containing more than one per cent of its titanium in a reduced state having a valence of less than four, wherein the titaniferous material is heated in admixture with concentrated sulfuric acid to initiate exothermic reaction therebetween, the hot reaction mass is permitted to set in the form of a hard porous cake, and the resulting hot cake is baked by being retained at an elevated temperature for a sufficient period of time to effect more complete conversion of the titaniferous material to titanium sulfate, the improvement which comprises passing an oxygen-containing gas through the porous cake during the baking stage, and externally heating the porous cake during the passage of said gas therethrough to maintain the mass at a temperature within the range of 150° to 230° C. in order to promote oxidation of the reduced titanium to the tetravalent state by the oxygen content of said gas passing therethrough.

3. In the sulfuric acid digestion of titaniferous material, said material having been obtained by electrothermal smelting of a titaniferous ore in the presence of a carbonaceous reducing material and consequently containing more than one per cent of its titanium in a reduced state having a valence of less than four, wherein the titaniferous material is heated in admixture with concentrated sulfuric acid to initiate exothermic reaction therebetween, the hot reaction mass is permitted to set in the form of a hard porous cake, and the resulting hot cake is baked by being retained at an elevated temperature for a sufficient period of time to effect more complete conversion of the titaniferous material to titanium sulfate, the improvement which comprises passing an oxygen-containing gas through the porous cake during the baking stage, and maintaining the porous cake during the passage of said gas therethrough at a temperature of about 170-200° C. in order to promote oxidation of the reduced titanium to the tetravalent state by the oxygen content of said gas passing therethrough.

4. In the sulfuric acid digestion of titaniferous material, said material having been obtained by electrothermal smelting of a titaniferous ore in the presence of a carbonaceous reducing material and consequently containing more than one per cent of its titanium in a reduced state having a valence of less than four, wherein the titaniferous material is heated in admixture with concentrated sulfuric acid to initiate exothermic reaction therebetween, the hot reaction mass is permitted to set in the form of a hard porous cake, and the resulting hot cake is baked by being retained at an elevated temperature for a sufficient period of time to effect more complete conversion of the titaniferous material to titanium sulfate, the improvement which comprises passing an oxygen-containing gas through the porous cake during the baking stage, and externally heating the porous cake during the passage of said gas therethrough to maintain the cake at a temperature of about 170–200° C. in order to promote oxidation of the reduced titanium to the tetravalent state by the oxygen content of said gas passing therethrough.

JOHN H. WEIKEL.

REFERENCES CITED

The following references are of record in the file of this patent:

UNITED STATES PATENTS

| Number | Name | Date |
| --- | --- | --- |
| 1,389,191 | Goldschmidt | Aug. 30, 1921 |
| 1,889,027 | Washburn | Nov. 29, 1932 |
| 2,069,554 | Monk et al. | Feb. 2, 1937 |
| 2,125,340 | Hager | Aug. 2, 1938 |
| 2,149,370 | Smith | Mar. 7, 1939 |
| 2,192,501 | McKinney | Mar. 5, 1940 |
| 2,290,111 | Merriam et al. | July 14, 1942 |
| 2,292,507 | Brooks | Aug. 11, 1942 |
| 2,476,453 | Peirce et al. | July 19, 1949 |

FOREIGN PATENTS

| Number | Country | Date |
| --- | --- | --- |
| 22,895 | Norway | Jan. 6, 1913 |